(12) United States Patent
Wilt et al.

(10) Patent No.: US 7,499,552 B2
(45) Date of Patent: Mar. 3, 2009

(54) CIPHER METHOD AND SYSTEM FOR VERIFYING A DECRYPTION OF AN ENCRYPTED USER DATA KEY

(75) Inventors: Andrew N. Wilt, Tucson, AZ (US); Michael J. Kelly, Staatsburg, NY (US)

(73) Assignee: International Business Machines Corporation, Armonk, NY (US)

(*) Notice: Subject to any disclaimer, the term of this patent is extended or adjusted under 35 U.S.C. 154(b) by 337 days.

(21) Appl. No.: 11/329,773

(22) Filed: Jan. 11, 2006

(65) Prior Publication Data

US 2007/0160202 A1 Jul. 12, 2007

(51) Int. Cl.
*H04L 9/00* (2006.01)

(52) U.S. Cl. .................. 380/281; 380/28; 380/29; 380/30; 380/284

(58) Field of Classification Search ................ 380/281, 380/284
See application file for complete search history.

(56) References Cited

U.S. PATENT DOCUMENTS

| | | | |
|---|---|---|---|
| 4,876,716 A | 10/1989 | Okamoto | |
| 5,124,117 A | 6/1992 | Tatebayashi et al. | |
| 5,142,578 A | 8/1992 | Matyas et al. | |
| 5,144,665 A | 9/1992 | Takaragi et al. | |
| 5,199,070 A | 3/1993 | Matsuzaki et al. | |
| 5,200,999 A | 4/1993 | Matyas et al. | |
| 5,201,000 A | 4/1993 | Matyas et al. | |
| 5,224,166 A | 6/1993 | Hartman, Jr. | |
| 5,265,164 A | 11/1993 | Matyas et al. | |
| 5,325,433 A | 6/1994 | Torii et al. | |
| 5,345,506 A | 9/1994 | Tsubakiyama et al. | |
| 5,442,706 A | 8/1995 | Kung | |
| 5,481,613 A | 1/1996 | Ford et al. | |
| 5,557,678 A | 9/1996 | Ganesan | |
| 5,596,642 A | 1/1997 | Davis et al. | |
| 5,596,643 A | 1/1997 | Davis et al. | |
| 5,604,801 A | 2/1997 | Dolan et al. | |
| 5,621,796 A | 4/1997 | Davis et al. | |
| 5,638,445 A | 6/1997 | Spelman et al. | |
| 5,680,458 A | 10/1997 | Spelman et al. | |
| 5,689,567 A | 11/1997 | Miyauchi | |

(Continued)

OTHER PUBLICATIONS

Housley, "Cryptographic Message Syntax", Jun. 1, 1999, pp. 34-45.*

(Continued)

*Primary Examiner*—Benjamin E Lanier
(74) *Attorney, Agent, or Firm*—Kunzler & McKenzie

(57) ABSTRACT

A cipher method for verifying a decryption of an encrypted user data key used to encrypt user data prior to an encryption of the user data key with an encryption key. The cipher method involves a decryption of the encrypted user data key with a decryption key in response to an initiation of a decryption of the encrypted user data with the user data key as decrypted with the description key, a decryption of the verification text with the user data key as decrypted with the decryption key, and a validation/invalidation of a use of the user data key as decrypted with the decryption key to decrypt the encrypted user data in response to a matched/unmatched comparison of the verification text as decrypted with the user data key and an intermixing of a known text and a random text.

15 Claims, 6 Drawing Sheets

U.S. PATENT DOCUMENTS

| | | | |
|---|---|---|---|
| 5,724,425 | A | 3/1998 | Chang et al. |
| 5,737,419 | A | 4/1998 | Ganesan |
| 5,740,246 | A | 4/1998 | Saito |
| 5,745,571 | A | 4/1998 | Zuk |
| 5,745,573 | A | 4/1998 | Lipner et al. |
| 5,748,735 | A | 5/1998 | Ganesan |
| 5,761,306 | A | 6/1998 | Lewis |
| 5,764,772 | A | 6/1998 | Kaufman |
| 5,768,389 | A | 6/1998 | Ishii |
| 5,778,072 | A | 7/1998 | Samar |
| 5,796,833 | A | 8/1998 | Chen et al. |
| 5,799,086 | A | 8/1998 | Sudia |
| 5,841,865 | A | 11/1998 | Sudia |
| 5,850,450 | A | 12/1998 | Schweitzer et al. |
| 5,850,451 | A | 12/1998 | Sudia |
| 5,870,477 | A | 2/1999 | Sasaki et al. |
| 5,883,958 | A | 3/1999 | Ishiguro et al. |
| 5,903,882 | A | 5/1999 | Asay et al. |
| 5,920,630 | A | 7/1999 | Wertheimer et al. |
| 5,933,854 | A | 8/1999 | Yoshimura |
| 5,937,066 | A | 8/1999 | Gennaro et al. |
| 5,943,424 | A | 8/1999 | Berger et al. |
| 5,956,406 | A | 9/1999 | Maldy |
| 5,987,134 | A | 11/1999 | Shin et al. |
| 6,009,177 | A | 12/1999 | Sudia |
| 6,011,848 | A | 1/2000 | Kanda et al. |
| 6,072,876 | A | 6/2000 | Obata |
| 6,073,234 | A | 6/2000 | Kigo et al. |
| 6,084,965 | A | 7/2000 | Ahn et al. |
| 6,226,618 | B1 | 5/2001 | Downs et al. |
| 6,240,187 | B1 | 5/2001 | Lewis |
| 6,246,767 | B1 | 6/2001 | Akins, III et al. |
| 6,259,790 | B1 | 7/2001 | Takagi et al. |
| 6,298,153 | B1 | 10/2001 | Oishi |
| 6,307,936 | B1 * | 10/2001 | Ober et al. .................... 380/30 |
| 6,396,929 | B1 | 5/2002 | Chandersekaran et al. |
| 6,434,238 | B1 | 8/2002 | Chaum et al. |
| 6,438,694 | B2 | 8/2002 | Saito |
| 6,442,525 | B1 | 8/2002 | Silverbrook et al. |
| 6,526,508 | B2 | 2/2003 | Akins et al. |
| 6,535,607 | B1 | 3/2003 | Chandersekaran et al. |
| 6,560,336 | B1 | 5/2003 | Arita |
| 6,574,611 | B1 | 6/2003 | Matsuyama et al. |
| 6,615,350 | B1 | 9/2003 | Schell et al. |
| 6,678,821 | B1 | 1/2004 | Waugh et al. |
| 6,708,272 | B1 | 3/2004 | McCown et al. |
| 6,711,263 | B1 | 3/2004 | Nordenstam et al. |
| 6,868,160 | B1 | 3/2005 | Raji |
| 6,907,127 | B1 * | 6/2005 | Kravitz et al. ................ 380/277 |
| 6,914,985 | B1 | 7/2005 | Shrader et al. |
| 6,948,069 | B1 | 9/2005 | Teppler |
| 6,952,475 | B1 | 10/2005 | Horn et al. |
| 6,957,329 | B1 | 10/2005 | Aleksic et al. |
| 6,959,085 | B1 | 10/2005 | Hoffstein et al. |
| 6,978,017 | B2 | 12/2005 | Wiener et al. |
| 6,986,044 | B1 | 1/2006 | Inada |
| 7,191,466 | B1 * | 3/2007 | Hamid et al. ................... 726/3 |
| 2001/0029581 | A1 * | 10/2001 | Knauft ....................... 713/193 |
| 2002/0007457 | A1 | 1/2002 | Neff |
| 2002/0035687 | A1 * | 3/2002 | Skantze ....................... 713/168 |
| 2002/0136401 | A1 | 9/2002 | Hoffstein et al. |
| 2003/0133575 | A1 * | 7/2003 | Challener .................... 380/277 |
| 2003/0156714 | A1 | 8/2003 | Okeya |
| 2003/0177267 | A1 * | 9/2003 | Orava et al. .................. 709/245 |
| 2004/0003246 | A1 * | 1/2004 | Hopkins et al. .............. 713/168 |
| 2004/0120519 | A1 | 6/2004 | Joye et al. |
| 2004/0151309 | A1 | 8/2004 | Gentry et al. |
| 2005/0021941 | A1 | 1/2005 | Ohmori et al. |
| 2005/0135609 | A1 | 6/2005 | Lee et al. |
| 2005/0195975 | A1 | 9/2005 | Kawakita |
| 2006/0034454 | A1 * | 2/2006 | Damgaard et al. ............ 380/28 |
| 2006/0050870 | A1 * | 3/2006 | Kimmel et al. ............... 380/30 |

OTHER PUBLICATIONS

Jueneman, "RE: A New Triple-DES key Wrap Algorithm", Feb. 3, 1999.*
Gutmann, "Password-based Encryption for S/MIME", Jun. 15, 1999.*
Jueneman; "RE: A New Triple-DES Key Wrap Algorithm"; Feb. 3, 1999.
Gutmann; "Password-based Encryption for S/MIME"; Jun. 15, 1999.
Housley; "Cryptographic Message Syntax"; Jun. 1, 1999.

* cited by examiner

CIPHER METHOD AND SYSTEM FOR VERIFYING A DECRYPTION OF AN ENCRYPTED USER DATA KEY

FIELD OF THE INVENTION

The present invention generally relates to cryptography and cryptanalysis. The present invention specifically relates to methods for methods for checking validity of a decrypted user data key upon a restore of encrypted user data in a manner that links the user data key and a key used to decrypt an encryption of the user data key.

BACKGROUND OF THE INVENTION

Cryptography involves an encryption process for encoding the contents of a plaintext on a stream, block or unit basis to yield a ciphertext that conceals the contents of the plaintext, and a decryption process for decoding the ciphertext on a stream, block or unit basis to retrieve the contents of the plaintext. The method of encryption and decryption is called a cipher, which typically use one or more keys to control the encryption of the plaintext and the decryption of the ciphertext. There are threes (3) classes of key-based cipher methods.

The first class is symmetric key-based cipher methods that are based on using a secret key or a key randomly derived from the secret key for both encryption and decryption, or using the secret key or the key randomly derived from the secret key for encryption only while deriving the decryption key from the encryption key. Some well known symmetric key-based cipher methods are Data Encryption Standard ("DES"), Advanced Encryption Standard ("AES"), the One-Time Pad ("OTP"), Blowfish, IDEA and RC4.

The second class is asymmetric key-based cipher methods that are based on using a different key for encryption and decryption where the decryption key (a.k.a. the "private key") cannot be derived from the encryption key (a.k.a the "public key)". Some well known asymmetric key-based cipher methods are Rivest-Shamir-Adleman ("RSA") and Rabin.

The third class is hybrid key-based cipher methods that are based on using an asymmetric public-key to derive a symmetric key for both encryption and decryption, or a symmetric key for encryption while deriving the decryption key from the symmetric key.

Cryptanalysis involves a decoding, without any knowledge of the appropriate key(s), of a ciphertext on a stream basis or a block basis to retrieve the contents of a corresponding plaintext. Some well known cryptanalysis techniques are brute force attacks, ciphertext-only attacks, known-plaintext attacks, chosen-plaintext attacks, man-in-the-middle attacks, key-output correlation attacks, attacks against the underlying hardware, and attacks using faults in the underlying software and/or hardware.

Cryptography deals with all aspects of secure messaging, authentication, digital signatures, electronic money, and other well known applications. Furthermore, most cryptographic algorithms are designed to be executed by computers and by specialized hardware devices. Thus, the computer industry is continually striving to design computer software and specialized hardware devices that minimize, if not eliminate, any cryptanalysis attack on the computer software and/ or its underlying computer hardware, and on specialized hardware devices.

In particular, a Data Set Services ("DFSMSdss™") DUMP of user data with encryption involves an encryption of a user data key used to encrypt the user data and a storage of the encrypted user data key in a DFSMSdss™ dump data set. Specifically, the user data key is encrypted with an RSA public key based on a reference label of the RSA public key whereby, during a restore of the encrypted user data, a RSA private key is used to decrypt the encrypted user data key based on the reference label of the RSA public key or a reference label of the RSA private key. It is imperative that the encrypted user data key is correctly decrypted with the RSA private key to ensure a correct decryption of the encrypted user data with the user data key as decrypted with the RSA private key. Currently, there does not exist a secure and reliable method for verifying a correct decryption of the encrypted user data key in view of the reference labeling of the RSA public key encryption—RSA private key decryption of the user data key.

SUMMARY OF THE INVENTION

The present invention provides new and unique method and system for verifying decryption of an encrypted user data key.

One form of the present invention is a signal bearing medium tangibly embodying a program of machine-readable instructions executable by a processor to perform operations for verifying a decryption of an encrypted user data key used to encrypt user data prior to an encryption of the user data key with an encryption key. The operations comprise a decryption of the encrypted user data key with a decryption key in response to an initiation of a decryption of the encrypted user data with the user data key as decrypted with the description key, a decryption of a verification text with the user data key as decrypted with the decryption key, a validation of a use of the user data key as decrypted with the decryption key to decrypt the encrypted user data in response to a matched comparison of the verification text as decrypted with the user data key and an intermixing of a known text and a random text, and an invalidation of the use of the user data key as decrypted with the decryption key to decrypt the encrypted user data in response to a mismatched comparison of the verification text as decrypted with the user data key and the intermixing of the known text and the random text.

A second form of the present invention is a cipher system comprising: a processor; and a memory storing instructions operable with the processor for verifying a decryption of an encrypted user data key used to encrypt user data prior to an encryption of the user data key with an encryption key. The instructions are executed for decrypting the encrypted user data key with a decryption key in response to an initiation of a decryption of the encrypted user data with the user data key as decrypted with the description key, decrypting a verification text with the user data key as decrypted with the decryption key, validating a use of the user data key as decrypted with the decryption key to decrypt the encrypted user data in response to a matched comparison of the verification text as decrypted with the user data key and an intermixing of a known text and a random text, and invalidating the use of the user data key as decrypted with the decryption key to decrypt the encrypted user data in response to a mismatched comparison of the verification text as decrypted with the user data key and the intermixing of the known text and the random text.

A third form of the present invention is a cipher method for verifying a decryption of an encrypted user data key used to encrypt user data prior to an encryption of the user data key with an encryption key. The cipher method involves a decryption of the encrypted user data key with a decryption key in response to an initiation of a decryption of the encrypted user data with the user data key as decrypted with the description key, a decryption of the verification text with the user data key as decrypted with the decryption key, a validation of a use of the user data key as decrypted with the decryption key to decrypt the encrypted user data in response to a matched comparison of the verification text as decrypted with the user data key and an intermixing of a known text and a random text, and an invalidation of a use of the user data key as decrypted with the decryption key to decrypt the encrypted user data in response to a mismatched comparison of the verification text as decrypted with the user data key and the intermixing of the known text and the random text.

The aforementioned forms and additional forms as wells as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENT INVENTION

Figure 1:
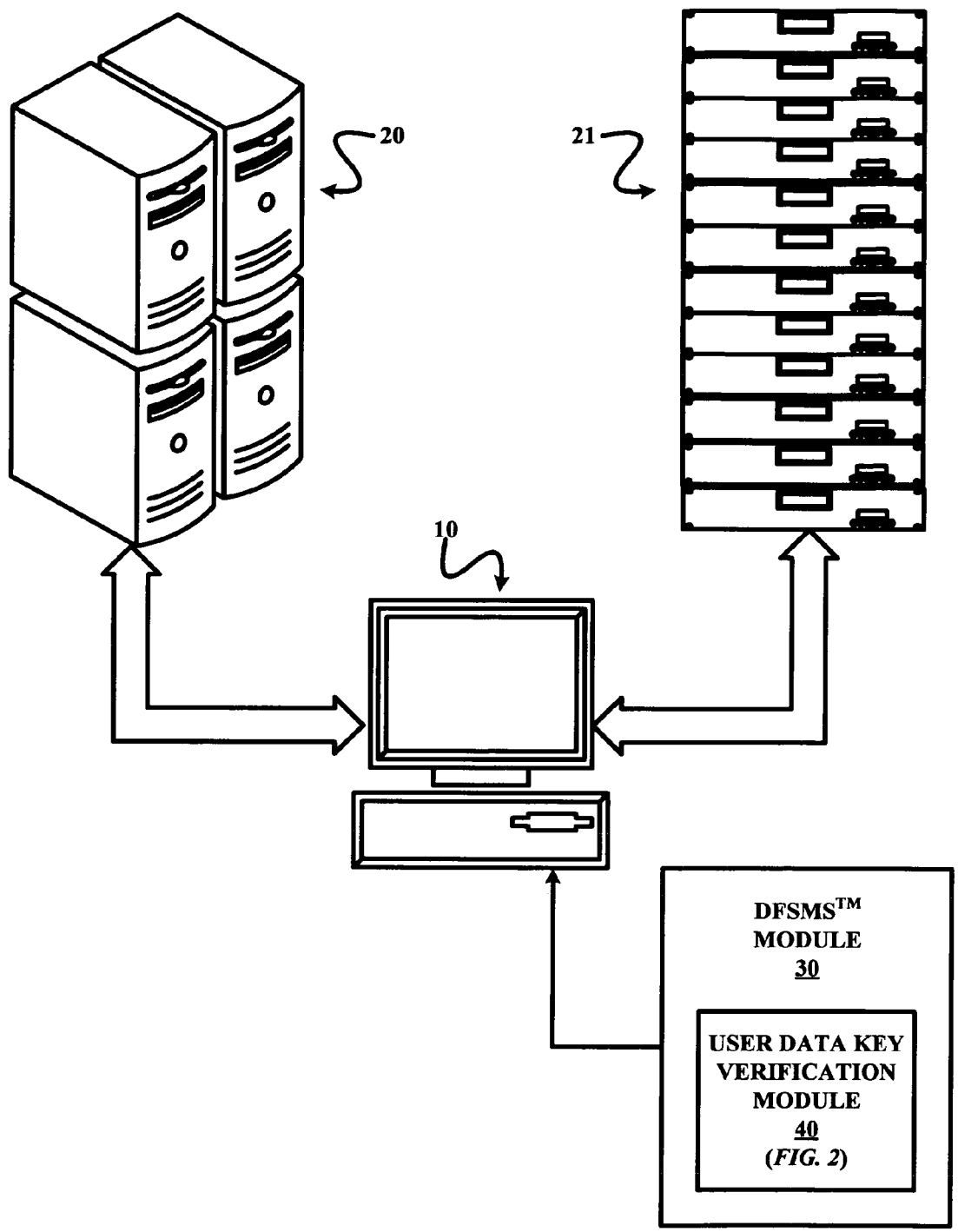
FIG. 1 illustrates one embodiment of a data management environment in accordance with the present invention.

FIG. 1 illustrates an exemplary data management environment in which certain embodiments of the present invention may be employed. The illustrated data management environment includes a data manager station 10, a data storage subsystem 20, a data tape drive system 21, and a DFSMS™ software module 30 installed in a memory (not shown) of data manager station 10. A processor (not shown) of data manager station 10 executes instructions of DFSMS™ module 30 to perform various functions related to a management of data stored in and between data storage subsystem 20 and data tape drive system 21 as would be appreciated by those having ordinary skill in the art.

Of particular interest to the present invention is a data dump with encryption feature and a data restore with decryption feature of module 30. Specifically, an issuance of a DFSMSdss DUMP command involved an encryption of user data subject to the data dump with a user data key that is thereafter itself encrypted with a RSA public key that is referenced by a label provided on the DFSMSdss DUMP command. The encrypted user data, the encrypted user data key and the RSA reference label are stored in a DFSMSdss data set to facilitate a subject issuance of a DFSMSdss RESTORE command involving a decryption of the encrypted user data key with a RSA private key and a decryption of the encrypted user data with the decrypted user data key. The RSA private key is either provided by module 30 at the time of the data restore or obtained from the RSA reference label stored in the DFSMS-dss data dump set. In either case, it is imperative that the correct RSA private key is used to decrypt the encrypted user data key to ensure a correct encryption of the encrypted user data.

Figure 2:
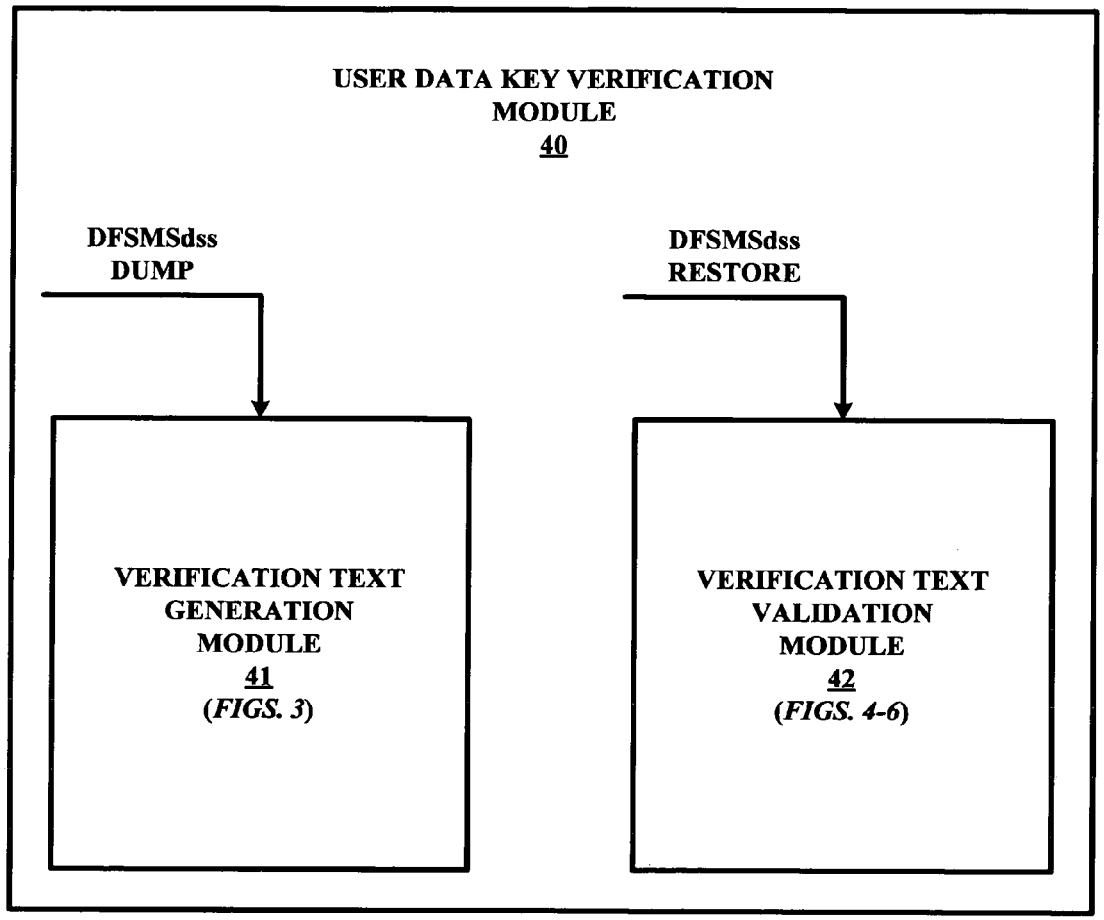
FIG. 2 illustrates one embodiment of a user data key verification module illustrated in FIG. 1 in accordance with the present invention.

To this end, module 30 includes a user data key verification module 40 of the present invention that can validate or invalidate an encrypted user data key for data restore purposes based on a link between a known text and the user data key. Specifically, as illustrated in FIG. 2, module 40 runs a verification text generation module 41 in response to module 30 issuing a DFSMSdss DUMP command whereby module 41 implements a verification text generation method of the present invention after the encryption of the user data with the user data key and prior to the encryption of the user data key with an encryption key (e.g., a RSA public key).

Figure 3:
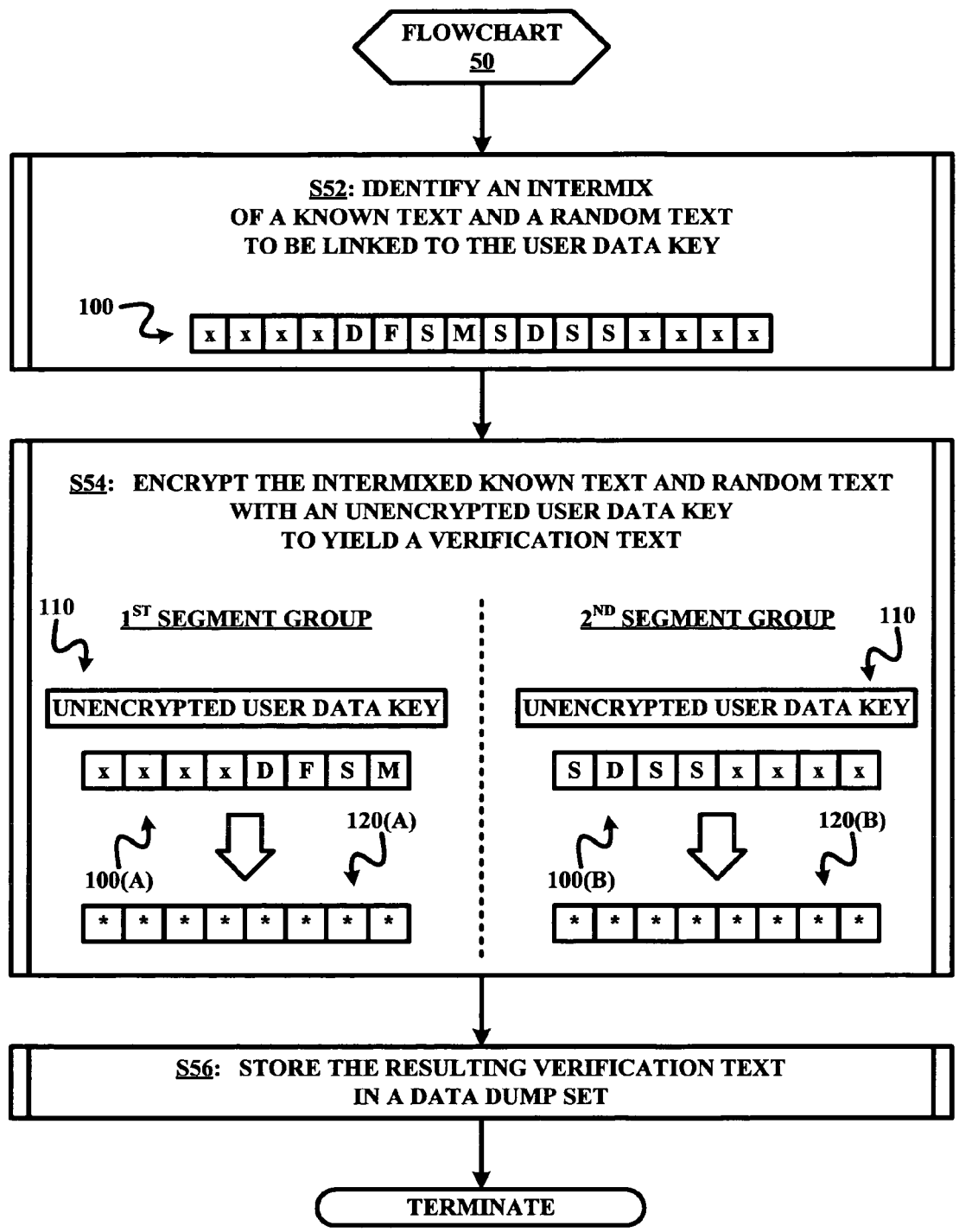
FIG. 3 illustrates a flowchart representative of one embodiment of a verification text generation method in accordance with the present invention.
Figure 4:
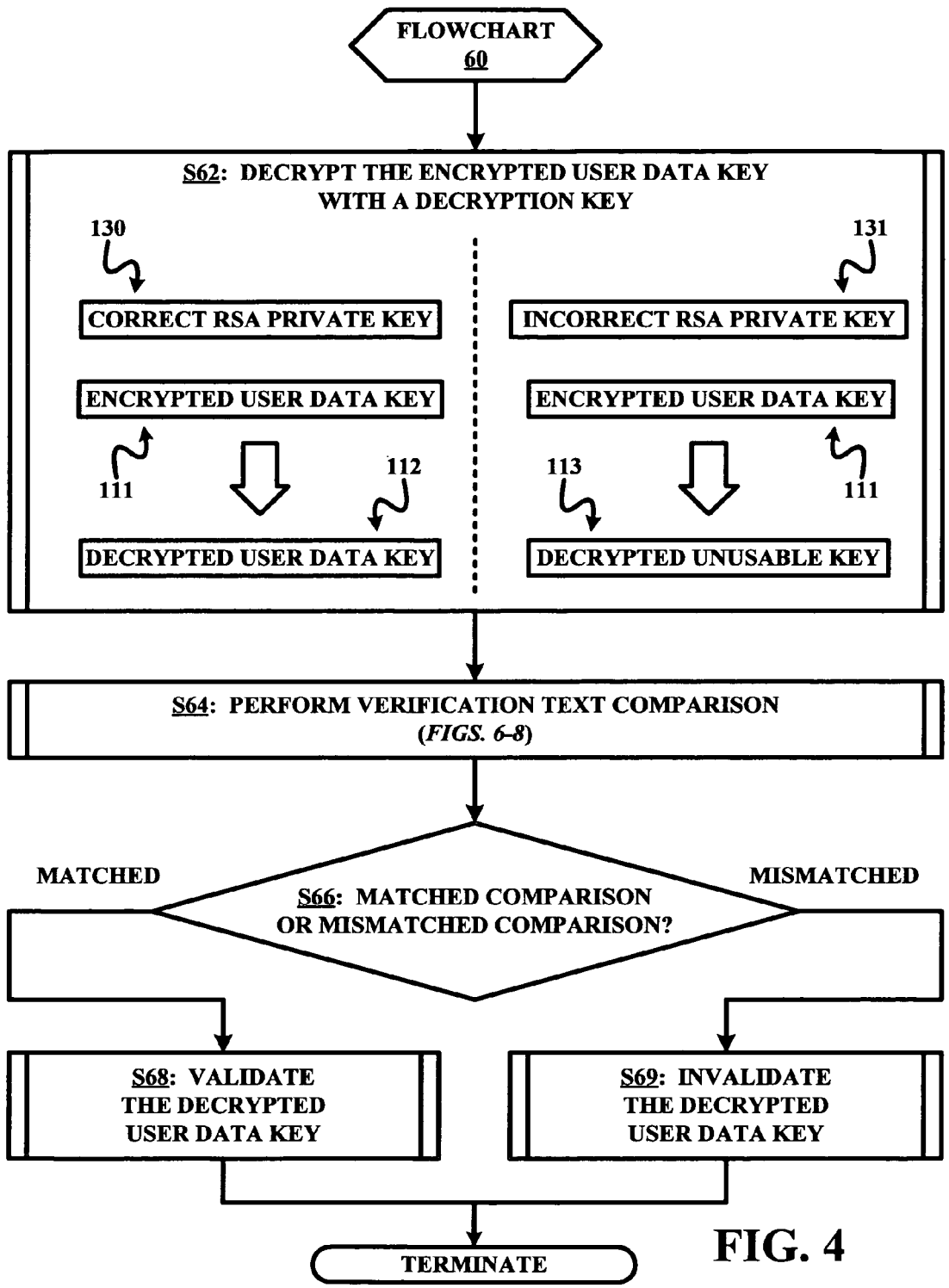
FIG. 4 illustrates a flowchart representative of one embodiment of a verification text validation method in accordance with the present invention.

FIG. 3 illustrates a flowchart 50 representative of a verification text generation method of the present invention. A stage S52 of flowchart 50 encompasses module 41 identifying an intermixing of a known text and a random text to be linked to the user data key. In practice, the present invention does not impose any limitations or restrictions as to the format and size of the intermixing of the known text and the random text. For purposes of facilitating an understanding of flowchart 50, an exemplary intermixed known text/random text 100 sequentially including four (4) bytes of random text "xxxx", eight (8) bytes of alphanumeric characters of known text "DFSMS-DSS" and four (4) bytes of random text "xxxx" is shown in FIG. 4.

A stage S54 of flowchart 50 encompasses module 41 encrypting the identified intermixed known text/random text with the unencrypted user data key to yield a verification text. To obtain an accurate encryption of the user data that is the subject of the data dump, an encryption of the user data key with an encryption key (e.g., a RSA public key) occurs after the user data key is used to encrypt the user data. Further, to establish and preserve a link between the intermixed known text/random text and the user data key, the intermixed known text/random text is encrypted with the user data key prior to the encryption of the user data key with the encryption key. For example, in one embodiment, intermixed known text/random text 100 can be encrypted as an entire group with unencrypted user data key 110. Also by example, as shown in FIG. 4, intermixed known text/random text 100 is segmented into two groups with each segment group having a segment of the known text and a segment of the random text. In this case, a $1^{st}$ segment group 100(A) includes the first four (4) bytes of the random text "xxxx" followed by the first four (4) bytes of known text "DFSM". Further, a $2^{nd}$ segment group 100(B) includes the second four (4) bytes of the known text "SDSS" followed by the second four (4) bytes of the random text "xxxx". Each segment group 100(A) and 100(B) are individually encrypted with the unencrypted user data key 110 to yield respective verification text segments 120(A) and 120(B) as shown.

A stage S56 of flowchart 50 encompasses module 41 storing the resulting verification text segments as the verification text in a DFSMSdss data dump set along with the standard contents of a DFSMSdss data dump set, such as, for example, the encrypted user data, the encrypted user data key, and an encryption key label (e.g., a RSA reference label). Flowchart 50 is terminated upon completion of stage S56 whereby the verification text is available via the DFSMSdss data dump set to validate or invalidate a restore decryption of the encrypted user data key with a decryption key (e.g., a RSA private key) as will be further explained herein.

Referring again to FIG. 2, module 40 runs a verification text comparison module 42 in response to module 30 issuing a DFSMSdss RESTORE command whereby module 42 implements a verification text comparison method of the present invention prior to a decryption of the encrypted user data.

FIG. 4 illustrates a flowchart 60 representative of the verification text comparison method of the present invention. A stage S62 of flowchart 60 encompasses module 42 decrypting the encrypted user data key as stored in the DFSMSdss data dump set with a decryption key (e.g., a RSA private key corresponding to a RSA reference label stored in the DFSMSdss data dump set). If the decryption key is a correct decryption key for decrypting the encrypted user key, then the resulting decrypted user data key correctly corresponds to the unencrypted user data key used to encrypt the user data. For example, as shown, a use of a correct RSA private key 130 as referenced by the stored RSA label to decrypt an encrypted user data key 111 as stored in the DFSMSdss data dump set results in a decrypted user data key 112 that corresponds to unencrypted user data key 110 (FIGS. 3 and 4) whereby the decrypted user data key 112 can be used to correctly decrypt the encrypted user data stored in the DFSMSdss data dump set.

If the decryption key is an incorrect decryption key for decrypting the encrypted user key, then the resulting decrypted key does not correspond to the unencrypted user data key used to encrypt the user data. For example, as shown, a use of an incorrect RSA private key 131 as improperly referenced by the stored RSA label to decrypt encrypted user data key 111 as stored in the DFSMSdss data dump set results in a decrypted unusable key 113 that does not correspond to unencrypted user data key 110 (FIGS. 3 and 4) whereby the decrypted unusable key 113 can not be used to correctly decrypt the encrypted user data stored in the DFSMSdss data dump set.

Upon completion of stage S62, module 41 does not know whether the decryption of the encrypted user data key with the decryption key resulted in a decrypted user data key (e.g., decrypted user data key 112) or a decrypted unusable data key (e.g., decrypted unusable key 113). Thus, module 41 implements a stage S64 of flowchart for performing a verification text comparison to ascertain the results of stage S62.

Figure 5:
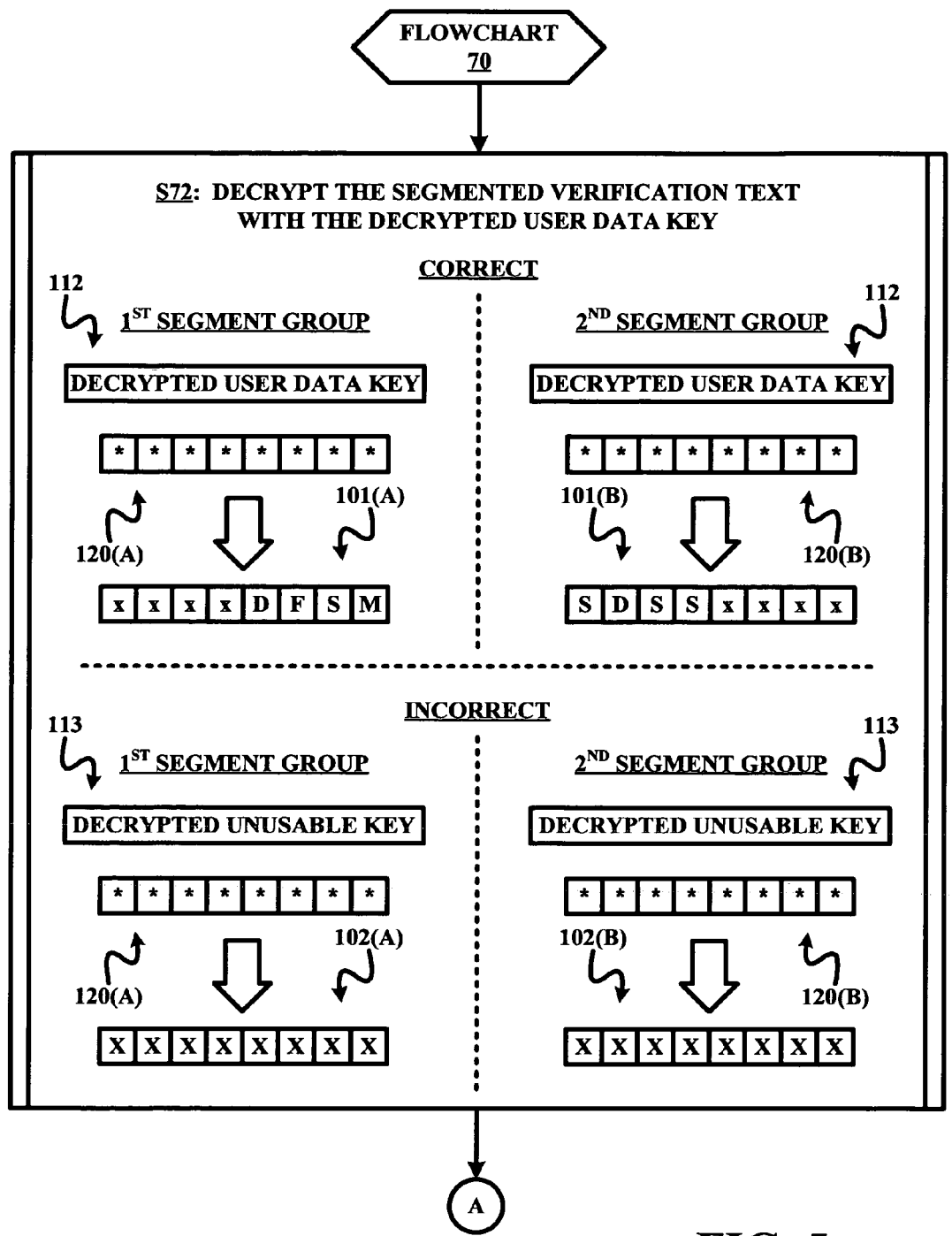
FIGS. 5 and 6 illustrate a flowchart representative of one embodiment of a verification text comparison method in accordance with the present invention.
Figure 6:
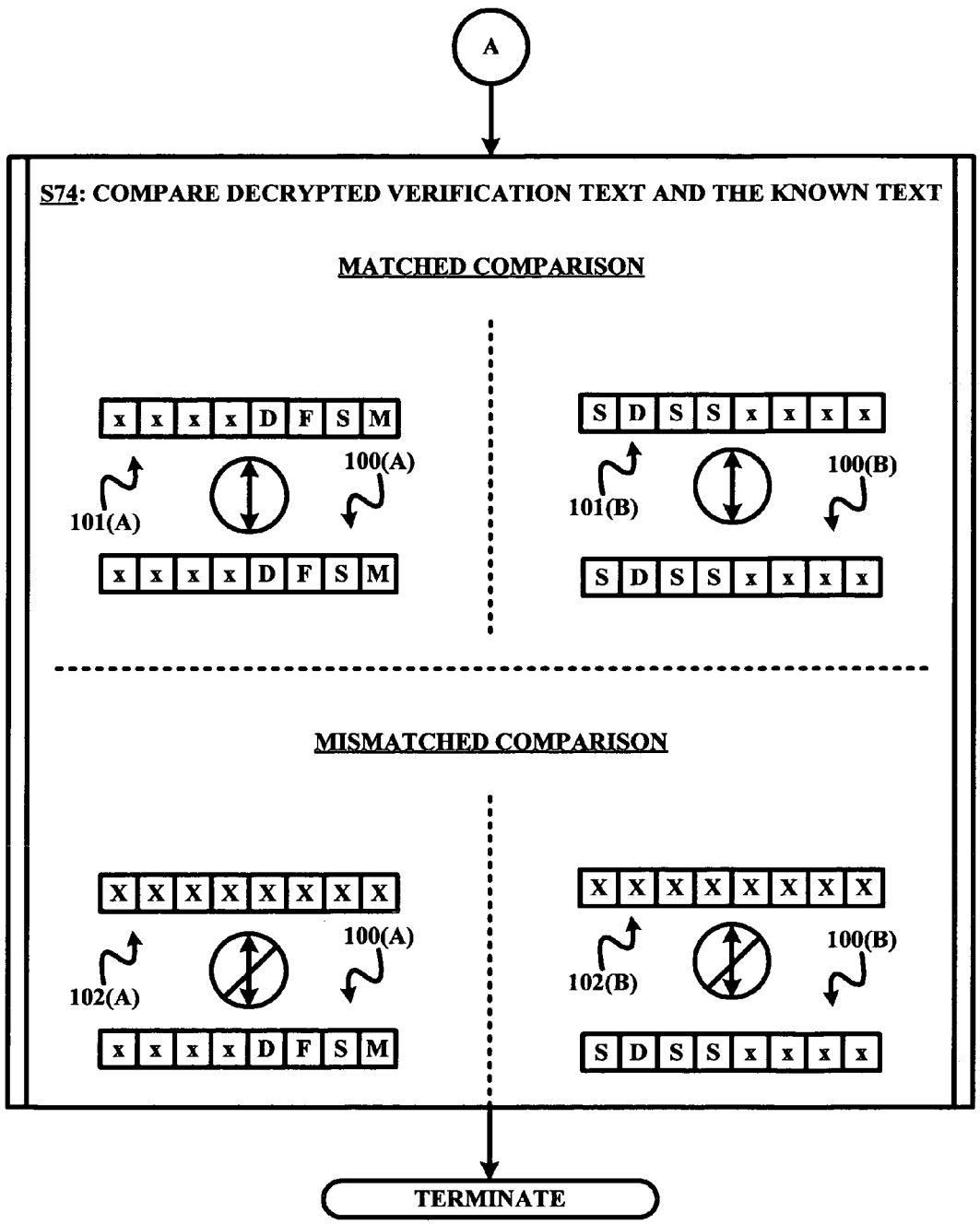

FIGS. 5 and 6 illustrate a flowchart 70 representative of a verification text comparison method of the present invention that is associated with flowchart 50 in view of the verification text as stored in the DFSMSdss data dump set being based on an intermixed known text/random text. A stage S72 of flowchart 70 encompasses module 42 decrypting the verification text as stored in the DFSMSdss data dump set with decrypted user data key to yield a decrypted verification text, and a stage S74 of flowchart 70 encompasses module 42 comparing the decrypted verification text to the intermixed known text/random text.

If the decryption of the encrypted user data key during stage S62 (FIG. 5) resulted in a decrypted user data key that corresponds to the unencrypted user data key used to encrypt the user data, then the decryption of the verification text with the decrypted user data key results in a decrypted verification text that matches the intermixed known text/random text. For example, as shown, a decryption of verification text segment 120(A) with the correct decrypted user data key 112 results in a decrypted verification text 101(A) that matches intermixed known text/random text segment 100(A) and a decryption of verification text segment 120(B) with the correct decrypted user data key 112 results in a decrypted verification text 101(1B) that matches intermixed known text/random text segment 100(B).

If the decryption of the encrypted user data key during stage S62 (FIG. 5) resulted in a decrypted unusable key that does not correspond to the unencrypted user data key used to encrypt the user data, then the decryption of the verification text with the decrypted unusable key results in a decrypted verification text that mismatches the intermixed known text/random text. For example, as shown, a decryption of verification text segment 120(A) with the incorrect decrypted unusable data key 113 results in a decrypted verification text 102(A) that mismatches intermixed known text/random text segment 100(A) and a decryption of verification text segment 120(B) with the incorrect decrypted unusable data key 113 results in a decrypted verification text 102(B) that mismatches intermixed known text/random text segment 100(B).

Referring again to FIG. 4, upon completion of flowchart 70 (FIG. 6), module 42 proceeds to validate the decrypted user data key during a stage S68 of flowchart 60 based on a determination by module 42 during a stage S66 of flowchart 60 of a matched comparison of the decrypted verification text and the intermixed known text/random text. Otherwise, module 51 proceeds to invalidate the decrypted user data key during a stage S69 of flowchart 60 based on a determination by module 42 during stage S66 of a mismatched comparison of the decrypted verification text and the intermixed known text/random text.

Referring to FIGS. 1-6, those having ordinary skill in the art will appreciate the numerous advantages of the present invention including, but not limited to, a method for verifying a correct and secure decryption on an encrypted user data key to thereby ensure a correct and secure decryption of encrypted user data with the decrypted user data key.

Referring to FIG. 1, in one embodiment, data manager station 10 employs a processor (not shown) for executing computer instructions in a memory (not shown) of station 10 with the computer instructions being programmed in any programming language suitable for implementing one or more of the flowcharts 50-70 illustrated in FIGS. 3-6.

Those having ordinary skill in the art of verification text generation and validation techniques may develop other embodiments of the invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

We claim:

1. A cipher system, comprising: a processor; and a memory storing instructions operable with the processor for verifying a decryption of an encrypted user data key used to encrypt user data prior to an encryption of the user data key with an encryption key, the instructions being executed for:

intermixing eight bytes of random text with eight bytes of text comprising alphanumeric characters "DFSMS-DSS" to create an intermixed text;

encrypting the intermixed text with the user data key to create a verification text;

decrypting the encrypted user data key with a decryption key in response to an initiation of a decryption of the encrypted user data with the user data key as decrypted with the decryption key;

decrypting the verification text with the user data key as decrypted with the decryption key;

validating a use of the user data key as decrypted with the decryption key to decrypt the encrypted user data in response to a matched comparison of the verification text as decrypted with the user data key and the intermixed text; and invalidating the use of the user data key as decrypted with the decryption key to decrypt the encrypted user data in response to a mismatched comparison of the verification text as decrypted with the user data key and the intermixed text.

2. The cipher system of claim 1, wherein the instructions are further executed for:

segmenting the intermixed text; and encrypting the segmented intermixed text with the user data key prior to the encryption of the user data key with the encryption key, wherein the verification text is the segmented intermixed text in segments encrypted with the user data key.

3. The cipher system of claim 1, wherein the verification text includes a first verification segment, a second verification segment, a third verification segment and a fourth verification segment in sequential order; wherein the first verification segment includes an encryption of a first random text segment with the user data key prior to the encryption of the user data key with the encryption key; wherein the second verification segment includes an encryption of a first known text segment "DFSM" with the user data key prior to the encryption of the user data key with the encryption key; wherein the third verification segment includes an encryption of a second known text segment "SDSS" with the user data key prior to the encryption of the user data key with the encryption key; and wherein the fourth verification segment includes an encryption of a second random text segment with the user data key prior to the encryption of the user data key with the encryption key.

4. The cipher system of claim 3, wherein the instructions are further executed for:

encrypting a first grouping of the first known text segment and the first random text segment with the user data key prior to the encryption of the user data key with the encryption key;

encrypting a second grouping of the second known text segment and the second random text segment with the user data key prior to the encryption of the user data key with the encryption key; and storing the verification text including the encrypted first grouping of the first known text segment and the first random text segment and the encrypted second grouping of the second known text segment and the second random text segment.

5. The cipher system of claim 4, wherein the decrypting of the verification text with the user data key as decrypted with the decryption key includes:

decrypting the first grouping of the first known text segment and the first random text segment with the user data key as decrypted with the decryption key; and decrypting the second grouping of the second known text segment and the second random text segment with the user data key as decrypted with the decryption key.

6. The cipher system of claim 1, wherein the encryption key is a public key; and wherein the decryption key is a private key.

7. A cipher method for verifying a decryption of an encrypted user data key used to encrypt user data prior to an encryption of the user data key with an encryption key, the cipher method comprising:

intermixing eight bytes of random text with eight bytes of text comprising alphanumeric characters "DFSMS-DSS" to create an intermixed text;

encrypting the intermixed text with the user data key to create a verification text;

decrypting the encrypted user data key with a decryption key in response to an initiation of a decryption of the encrypted user data with the user data key as decrypted with the description key;

decrypting the verification text with the user data key as decrypted with the decryption key;

validating a use of the user data key as decrypted with the decryption key to decrypt the encrypted user data in response to a matched comparison of the verification text as decrypted with the user data key and the intermixed text; and invalidating the use of the user data key as decrypted with the decryption key to decrypt the encrypted user data in response to a mismatched comparison of the verification text as decrypted with the user data key and the intermixed text.

8. The cipher method of claim 7, further comprising:

segment the intermixed text; and encrypting the segmented intermixed text with the user data key prior to the encryption of the user data key with the encryption key, wherein the verification text is the segmented intermixed text in segments encrypted with the user data key.

9. The cipher method of claim 7, wherein the verification text includes a first verification segment, a second verification segment, a third verification segment and a fourth verification segment in sequential order; wherein the first verification segment includes an encryption of a first random text segment with the user data key prior to the encryption of the user data key with the encryption key; wherein the second verification segment includes an encryption of a first known text segment "DFSM" with the user data key prior to the encryption of the user data key with the encryption key; wherein the third verification segment includes an encryption of a second known text segment "SDSS" with the user data key prior to the encryption of the user data key with the encryption key; and wherein the fourth verification segment includes an encryption of a second random text segment with the user data key prior to the encryption of the user data key with the encryption key.

10. The cipher method of claim 9, further comprising:

encrypting a first grouping of the first known text segment and the first random text segment with the user data key prior to the encryption of the user data key with the encryption key;

encrypting a second grouping of the second known text segment and the second random text segment with the user data key prior to the encryption of the user data key with the encryption key; and storing the verification text including the encrypted first grouping of the first known text segment and the first random text segment and the encrypted second grouping of the second known text segment and the second random text segment.

11. The cipher method of claim 10, wherein the decrypting of the verification text with the user data key as decrypted with the decryption key includes:

decrypting the first grouping of the first known text segment and the first random text segment with the user data key as decrypted with the decryption key; and decrypting the second grouping of the second known text segment and the second random text segment with the user data key as decrypted with the decryption key.

12. The cipher method of claim 7, wherein the encryption key is a public key; and wherein the decryption key is a private key.

13. A method for ensuring correct and secure decryption on an encrypted user data key comprising:
    intermixing eight bytes of random text with eight bytes of text comprising alphanumeric characters "DFSMS-DSS" to create an intermixed text;
    encrypting the intermixed text with the user data key to create a verification text;
    initiating a decryption of an encrypted user data using the encrypted user data key;
    decrypting the encrypted user data key based on the initiation using a decryption key;
    decrypting the verification text with the user data key as decrypted with the decryption key;
    comparing the decrypted verification text with the intermixed text;
    validating a use of the user key based on the comparison; and
    ensuring correct and secure decryption of the encrypted user data with the decrypted user data key based on the validated use.

14. The method of claim 13 wherein the method further comprises:
    issuing a DUMP of user data, including encrypting the user data into an encrypted user data using a user data key;
    generating the verification text based on the encryption of the user data into the encrypted user data;
    encrypting the user data key into the encrypted user data key based on generating the verification text;
    storing the verification text with the encrypted user data; and
    receiving a RESTORE, wherein the initiation of the decryption is responsive to the RESTORE.

15. The method of claim 14 wherein the DUMP is responsive to a Data Set Services DUMP command, and wherein the RESTORE is responsive to a Data Set Services RESTORE command.

* * * * *